United States Patent
Lee et al.

(10) Patent No.: US 9,260,787 B2
(45) Date of Patent: Feb. 16, 2016

(54) HOT-DIP GALVANIZED STEEL SHEET HAVING EXCELLENT ADHESIVENESS AT ULTRA-LOW TEMPERATURES

(71) Applicant: POSCO, Gyeongsangbuk-do (KR)

(72) Inventors: Ju-Youn Lee, Jeollanam-do (KR); Myung-Soo Kim, Jeollanam-do (KR); Jong-Sang Kim, Jeollanam-do (KR)

(73) Assignee: POSCO, Pohang-Si, Gyeongsangbuk-Do (KR)

( * ) Notice: Subject to any disclaimer, the term of this patent is extended or adjusted under 35 U.S.C. 154(b) by 0 days.

(21) Appl. No.: 14/366,842

(22) PCT Filed: Dec. 20, 2012

(86) PCT No.: PCT/KR2012/011172
§ 371 (c)(1),
(2) Date: Jun. 19, 2014

(87) PCT Pub. No.: WO2013/095007
PCT Pub. Date: Jun. 27, 2013

(65) Prior Publication Data
US 2014/0349133 A1    Nov. 27, 2014

(30) Foreign Application Priority Data
Dec. 23, 2011 (KR) .................... 10-2011-0141257

(51) Int. Cl.
*B32B 15/01* (2006.01)
*C23C 28/02* (2006.01)
(Continued)

(52) U.S. Cl.
CPC ............ *C23C 28/025* (2013.01); *B32B 15/015* (2013.01); *C21D 8/0236* (2013.01);
(Continued)

(58) Field of Classification Search
CPC .... B32B 15/01; B32B 15/015; B32B 15/013; B32B 15/04; B32B 15/18; B32B 15/20; C23C 2/00; C23C 2/04; C23C 2/12; C23C 2/06; C23C 2/20; C23C 2/02; C23C 2/28; C23C 2/26; C23C 28/021; C23C 28/025; C23C 28/02; C23C 28/023; C23C 30/005; Y10T 428/12438; Y10T 428/12799; Y10T 428/12933; Y10T 428/12958; Y10T 428/12972; Y10T 428/12973; Y10T 428/12931; Y10T 428/12937; Y10T 428/12792; Y10T 428/265
USPC .................................................. 428/607, 659
See application file for complete search history.

(56) References Cited

U.S. PATENT DOCUMENTS 5,447,802 A    9/1995  Tobiyama et al.
2002/0160221 A1  10/2002  Takeda et al.
(Continued)

FOREIGN PATENT DOCUMENTS

JP    57-070268    4/1982
JP    04-333551    11/1992
(Continued)

OTHER PUBLICATIONS

Machine Translation, Tada et al., JP 2007-262464, Oct. 2007.*
(Continued)

*Primary Examiner* — Michael E La Villa
(74) *Attorney, Agent, or Firm* — Finnegan Henderson Farabow Garrett & Dunner LLP

(57) ABSTRACT

Provided is a hot-dip galvanized steel sheet having excellent adhesiveness at ultra-low temperatures as well as fine spangles, and a method of manufacturing the same. According to the present invention, a hot-dip galvanized steel sheet having excellent adhesiveness at ultra-low temperatures includes a base steel sheet, a composite layer formed on the base steel sheet and including transition metal, an inhibition layer formed on the composite layer and including a iron-aluminum (Fe—Al) based intermetallic compound, and a zinc (Zn)-plated layer formed on the inhibition layer, in which an average diameter of spangles in the zinc-plated layer is 150 μm or less, and a method of manufacturing the hot-dip galvanized steel sheet is provided.

4 Claims, 4 Drawing Sheets

(51) Int. Cl.
| | |
|---|---|
| *B32B 15/04* | (2006.01) |
| *B32B 15/18* | (2006.01) |
| *B32B 15/20* | (2006.01) |
| *C23C 2/02* | (2006.01) |
| *C23C 2/06* | (2006.01) |
| *C21D 8/02* | (2006.01) |
| *C23C 2/28* | (2006.01) |
| *C23C 2/20* | (2006.01) |
| *C21D 1/74* | (2006.01) |
| *C25D 3/20* | (2006.01) |
| *C25D 5/36* | (2006.01) |
| *C25D 5/50* | (2006.01) |

(52) U.S. Cl.
CPC .............. *C21D8/0278* (2013.01); *C23C 2/02* (2013.01); *C23C 2/06* (2013.01); *C23C 2/20* (2013.01); *C23C 2/28* (2013.01); *C23C 28/021* (2013.01); *C21D 1/74* (2013.01); *C25D 3/20* (2013.01); *C25D 5/36* (2013.01); *C25D 5/50* (2013.01); *Y10T 428/12438* (2015.01); *Y10T 428/12799* (2015.01)

(56) References Cited

U.S. PATENT DOCUMENTS

| | | | |
|---|---|---|---|
| 2003/0082066 A1* | 5/2003 | Hajaligol et al. | 419/28 |
| 2008/0206592 A1 | 8/2008 | Kim et al. | |
| 2009/0162691 A1 | 6/2009 | Ishizuka et al. | |

FOREIGN PATENT DOCUMENTS

| | | |
|---|---|---|
| JP | 2002-180224 | 6/2002 |
| JP | 2005-200690 | 7/2005 |
| JP | 2007-262464 | 10/2007 |
| JP | 2008-144264 | 6/2008 |
| JP | 2008-525641 | 7/2008 |
| KR | 10-2004-0038503 | 5/2004 |
| KR | 10-2006-0076214 | 7/2006 |
| KR | 10-2011-0075612 | 7/2011 |
| KR | 10-2012-0038158 | 4/2012 |

OTHER PUBLICATIONS

Lee et al. in "Effect of Ni addition in zinc bath on formation of inhibition layer . . . " in J. Mat. Sci. Lettrs., vol. 20, 2001 (no month), pp. 955-957.*

International Search Report from the Korean Patent Office in International application No. PCT/KR2012/011172, Apr. 24, 2013, 2 pages.

Notice of Office Action with English language translation issued by the Japanese Patent Office on May 26, 2015, in counterpart Japanese Application No. 2014-548664.

Extended European Search Report for related European Application No. 12859008.0, mailed Oct. 8, 2015 (11 pages).

Strutzenberger, J. et al., "Solidification and Spangle Formation of Hot-Dip-Galvanized Zinc Coatings," *Metallurgical and Materials Transactions*, vol. 29A, Feb. 1998, pp. 631-646.

Xu, B.J., "Nucleation and growth of 55% Al—Zn alloy on steel substrate," A thesis submitted for the degree of Doctor of Philosophy, Faculty of Engineering, Univ. of Wollongong, Australia, 167 pgs, released for public view from Oct. 11, 2008.

* cited by examiner (a)

(b)

(a)

−20℃/s  −65℃/s

PLATED LAYER (b)

−20℃/s  −65℃/s

ADHESIVE (a)

(b)

HOT-DIP GALVANIZED STEEL SHEET HAVING EXCELLENT ADHESIVENESS AT ULTRA-LOW TEMPERATURES

TECHNICAL FIELD

The present invention relates to a hot-dip galvanized steel sheet, and more particularly, to a hot-dip galvanized steel sheet having excellent adhesiveness at ultra-low temperatures and a method of manufacturing the same.

BACKGROUND ART

Zinc (Zn)-plated steel sheets have been frequently used as automotive steel sheets for the purpose of surface appearance and corrosion resistance. Zn-plated steel sheets are broadly classified as hot-dip galvanized (GI) steel sheets and electro galvanized (EG) steel sheets. Hot-dip galvanized steel sheets are manufactured by using a method of plating a steel sheet through dipping in a hot-dip galvanizing bath, and electro galvanized steel sheets are plated by using an electroplating method.

Hot-dip galvanized steel sheets have better price competitiveness than electro galvanized steel sheets, but demand therefor is limited due to poor image clarity and appearance quality after coating. In order to address the foregoing limitations, a technique of refining spangles in a plated layer by using a technique (Patent Document 1) of electrostatic atomization of a phosphate solution on the zinc-plated layer after galvanizing has been developed. When the technique is used, a hot-dip galvanized steel sheet (GI-ACE steel sheet) having a spangle diameter ranging from about 50 µm to about 1000 µm in a zinc plated layer may be manufactured. The GI-ACE steel sheet obtained through the refinement of the spangles in the plated layer has excellent coating surface characteristics, such as coatability, corrosion resistance, and surface appearance, and has superior economic factors due to an insignificant change in price in comparison to that of a general GI steel sheet. That is, the GI-ACE steel sheet may be more suitable for the requirements of automotive steel sheets in comparison to a typical GI steel sheet.

Meanwhile, when automobiles are manufactured, structural adhesives may be, used in order to reinforce collision performance or as a substitute for welding. In order to use a structural adhesive, excellent adhesiveness is required to be secured through an impact peel test at an ultra-low temperature (about −40° C.).

In the case that the impact peel test is performed on the typical GI steel sheet, fractures may occur in the adhesive. This denotes that the zinc-plated layer has excellent adhesiveness. In contrast, with respect to the GI-ACE steel sheet, fractures may occur in the zinc-plated layer.

In general, it is known that brittle fractures occur in zinc in a (0001) plane and three {10-10} planes at low temperatures, and activity of zinc fracture mechanisms changes according to temperature from a brittle+grain boundary+ductile fracture type at a high temperature to a brittle fracture type at a low temperature. It is also known that fractures in a plated layer occur at spangle boundaries of the plated layer or an interface between a base steel sheet and the plated layer.

The occurrence of fractures at spangle boundaries or an interface may be due to the fact that voids are generated in spangle boundaries after hot-dip galvanizing, because volume changes due to shrinkage occurring when zinc solidifies. Also, since the difference between a thermal expansion coefficient of zinc (about 1.5 to $6.1 \times 10^{-5}$/K) and a thermal expansion coefficient of iron (about $1.18 \times 10^{-5}$/K) exists, the fracture at an interface may occur due to thermal misfit. Further, it is known that a relatively large amount of stress is applied to the spangle boundaries having a preferred orientation of the plated layer integrated on a (0001) plane and, as a result, fractures start at an interface between the base steel sheet and the plated layer.

Therefore, with respect to the GI-ACE steel sheet, the interface between the plated layer and the base steel sheet or the spangle boundaries having a preferred orientation integrated on a (0001) plane may act as crack initiation sites to generate a fracture.

In order to address the foregoing limitations of the GI-ACE steel sheet, a technique (Patent Document 2) of increasing an average diameter of spangles in the plated layer has been developed. However, surface qualities, such as image clarity, galling resistance, and corrosion resistance, may deteriorate as the diameter of spangles increases.

(Patent Document 1) Korean Patent Application Laid-Open Publication No. 2006-0076214

(Patent Document 2) Korean Patent Application Laid-Open Publication No. 2011-0075612

DISCLOSURE

Technical Problem

An aspect of the present invention provides a hot-dip galvanized steel sheet having excellent adhesiveness at ultra-low temperatures as well as excellent surface qualities, such as image quality and corrosion resistance, and a method of manufacturing the same.

Technical Solution

According to an aspect of the present invention, there is provided a hot-dip galvanized steel sheet having excellent adhesiveness at ultra-low temperatures including: a base steel sheet; a composite layer formed on the base steel sheet and including transition metal; an inhibition layer formed on the composite layer and including an iron-aluminum (Fe—Al) based intermetallic compound; and a zinc (Zn)-plated layer formed on the inhibition layer, wherein an average diameter of spangles in the zinc-plated layer is 150 µm or less.

According to another aspect of the present invention, there is provided a method of manufacturing a hot-dip galvanized steel sheet having excellent adhesiveness at ultra-low temperatures including: preparing a steel sheet; plating a transition metal on the steel sheet; heat treating the transition metal plated steel sheet to manufacture a heat treated steel sheet; cooling the heat treated steel sheet; dipping the cooled steel sheet in a hot-dip galvanizing bath to manufacture a hot-dip galvanized steel sheet; and cooling the hot-dip galvanized steel sheet.

Advantageous Effects

The present invention may provide a hot-dip galvanized steel sheet having excellent adhesiveness at ultra-low temperatures, in which a diameter of spangles in a zinc-plated layer is 150 µm or less and impact peel strength at ultra-low temperatures of −40° C. is 15 N/mm or more. Accordingly, a hot-dip galvanized steel sheet having excellent adhesiveness at ultra-low temperatures as well as excellent plating characteristics may be provided, and thus, may be widely used for the automotive steel sheets.

DESCRIPTION OF DRAWINGS

The above and other aspects, features and other advantages of the present invention will be more clearly understood from the following detailed description taken in conjunction with the accompanying drawings, in which.

BEST MODE

Figure 1:
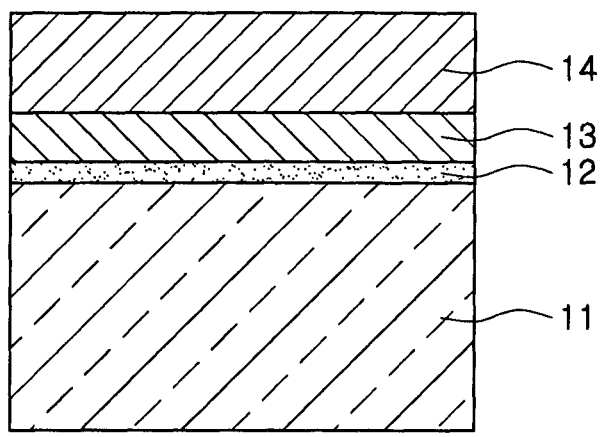
FIG. 1 is a schematic view illustrating a cross section of a hot-dip galvanizing steel sheet of the present invention.

Hereinafter, the present invention will be described in detail.

First, a hot-dip galvanized steel sheet according to an aspect of the present invention will be described in detail.

The hot-dip galvanized steel sheet of the present invention includes a base steel sheet; a composite layer formed on the base steel sheet and including a transition metal; an inhibition layer formed on the composite layer and including an iron-aluminum (Fe—Al)-based intermetallic compound; and a zinc (Zn)-plated layer formed on the inhibition layer, in which an average diameter of spangles in the zinc-plated layer is 150 µm or less.

In the present invention, a type of the base steel sheet is not particularly limited so long as the base steel sheet may be used for a hot-dip galvanized steel sheet, such as a hot-rolled steel sheet, a cold-rolled steel sheet, and an annealed steel sheet.

The hot-dip galvanized steel sheet of the present invention includes a composite layer including a transition metal on the base steel sheet. The composite layer is formed between the base steel sheet and the inhibition layer to later be described, and acts to improve interfacial adhesion through a conformal relationship with the inhibition layer and the base steel sheet. Excellent adhesiveness at low temperatures may be secured due to the formation of the composite layer.

The composite layer includes transition metal. In the present invention, a type of the transition metal is not particularly limited. For example, the transition metal may include Fe, cobalt (Co), nickel (Ni), etc. As described below, the transition metal may be included by transition metal plating before hot-dip galvanizing.

The composite layer is formed between the base steel sheet and the inhibition layer, and a composition thereof for securing interfacial adhesion may include 50 wt % to 90 wt % of a sum of Fe and transition metal, 10 wt % to 30 wt % of Al, and other unavoidable impurities as a remainder. Since a composition of the inhibition layer includes 30 wt % or more of Al and 50 wt % or less of Fe and a composition of the base steel sheet includes 90 wt % or more of Fe, the sum of Fe and transition metal, and Al in the composite layer may respectively be in ranges of 50 wt % to 90 wt % and 10 wt % to 30 wt %, in order to maintain the conformal relationship therewith and secure interfacial adhesion.

The composite layer may be in conformal relationship with the inhibition layer and the base steel sheet. Since the composite layer is in conformal relationship having the same crystallographic orientation with the inhibition layer and the base steel sheet, interfacial adhesion between the inhibition layer and the base steel sheet, i.e., adhesiveness, is improved. The composite layer may have a cubic structure. As described above, the composite layer may have a cubic structure in order to maintain a conformal relationship with the inhibition layer and the base steel sheet. Fe in the base steel sheet has a cubic structure, and the composite layer may also have a cubic structure in order to obtain conformal relationship by forming the composite layer on the base steel sheet having a cubic structure.

A thickness of the composite layer may be 80 nm or more. The thickness of the composite layer may be a minimum of 80 nm or more in order to secure interfacial adhesion. The thicker the composite layer is, the better the adhesion may be. However, since costs may increase in the case that the composite layer is excessively thick, the thickness of the composite layer may be a maximum of 500 µm.

The inhibition layer acts to increase bonding force with respect to the Zn-plated layer. In the case that the Zn-plated layer is formed without the inhibition layer, since overall detachment of Zn occurs during processing, the inhibition layer includes a Fe—Al based compound, and may include a compound having Zn partially included in $Fe_2Al_5$.

The average diameter of spangles in the zinc-plated layer may be 150 µm or less. It is desirable that the average diameter of spangles be as small as possible. The reason for this is that surface appearance is better in the case that the spangle is refined. Therefore, the average diameter of spangles in the zinc-plated layer in the present invention may be a maximum of 150 µm.

Hereinafter, a method of manufacturing a hot-dip galvanized steel sheet according to another aspect of the present invention will be described in detail.

First, a steel sheet is prepared. As describe above, a type of the steel sheet is not particularly limited, and any steel sheet may be used so long as it is used for a hot-dip galvanized steel sheet through hot-dip galvanizing.

Surface cleaning may be performed in order to remove foreign objects or an oxide layer from a surface of the steel sheet. The surface cleaning may be performed through degreasing and pickling treatments. The degreasing and pickling treatments are performed by well-known methods. In the case that the surface cleaning may be insufficient, plating may be insufficient during Fe plating to be described later, and plating appearance and adhesion may deteriorate.

Transition metal plating is performed on the surface of the steel sheet. As described above, a type of the transition metal is not particularly limited. For example, the transition metal may include Fe, Co, Ni, etc.

Any plating method may be used for plating a transition metal. For example, a method of electroplating Fe may be used. In the case that Fe is electroplated, an electrolyte including $FeSO_4 \cdot 7H_2O$ and $(NH_4)_2SO_4$ may be used. A coating weight of the transition metal plating may be 350 mg/m² or more. In the case that the transition metal coating weight is less than 350 mg/m², sufficient surface adhesion may not be secured due to the relatively low thickness of the composite layer. In the case that the transition metal coating weight is 350 mg/m² or more, the thickness of the composite layer may be 80 nm or more. In the present invention, an upper limit of the transition metal coating weight is not particularly limited, and the upper limit thereof may be 10 g/m² or less.

A heat treatment is performed on the transition metal-plated steel sheet. The heat treatment may be performed by heating to a temperature ranging from 750° C. to 900° C. at a heating rate of 1.5° C./s to 6° C./s in a reducing atmosphere and maintaining for 20 seconds or more. In the case that the heating rate is less than 1.5° C./s, an increase in the temperature of the steel sheet is relatively slow and thus, economic factors may deteriorate, and in the case in which the heating rate is greater than 6° C./s, removal of the residual stress in the steel sheet may not be facilitated, and recovery and recrystallization may be problematic. Therefore, an upper limit thereof may be 6° C./s. Also, recovery and recrystallization may be appropriately undertaken in the foregoing temperature range of 750° C. to 900° C.

The reducing atmosphere may be a $H_2$—$N_2$ gas atmosphere. $H_2$—$N_2$ mixed gas may be used to prepare the reducing atmosphere, and, as an example of a mixing ratio therefor, 5 vol % to 10 vol % of hydrogen and nitrogen gas as a remainder may be used.

The maintaining time may be 20 seconds or more. In the case that the maintaining time is less than 20 seconds, sufficient surface adhesion may not be secured, because a composite region between the base steel sheet and the inhibition layer may be insufficiently formed. An upper limit of the maintaining time is not particularly limited, but the maintaining time may be 100 seconds or less. In the case that the maintaining time is relatively long, spangle growth may be excessive and thus, the material may not be uniform.

The heat treated steel sheet is cooled. The cooling may be performed to a temperature ranging from 450° C. to 500° C., a temperature up to a maximum of 50° C. higher than a temperature of a hot-dip galvanizing bath. In the case that the cooling temperature is less than 450° C., subsequent Zn plating may not be properly performed, and in the case in which the cooling temperature is greater than 500° C., surface defects, such as fume and dross, may occur.

Therefore, an upper limit thereof may be 500° C.

Hot-dip galvanizing is performed by dipping the cooled steel sheet in the hot-dip galvanizing bath. For example, the temperature of the hot-dip galvanizing bath may be in a range of 430° C. to 480° C. and a content of Al in the hot-dip galvanizing bath may be in a range of 0.1 wt % to 0.3 wt %. In the case that the content of Al is less than 0.1 wt %, Zn adhesion may decrease, and in the case in which the content of Al is greater than 0.3 wt %, defects, such as dross, may occur excessively. An immersion time in the hot-dip galvanizing bath may be in a range of 2.5 seconds to 8 seconds. Air wiping may be further performed in order to adjust Zn coating weight after the hot-dip galvanizing.

The hot-dip galvanized steel sheet is cooled. The cooling may be performed at a cooling rate of −20° C./s or less. In the case that the cooling rate is greater than −20° C./s, the diameter of spangle in the plated layer is 200 μm or more, and thus, the diameter of spangle may increase. In the case that the diameter of spangle in the plated layer is 200 μm or more, coating surface characteristics, i.e., coatability, corrosion resistance, galling resistance, image clarity, and surface appearance, may deteriorate. Hereinafter, examples of the present invention will be described in detail. The following examples are merely provided to allow for a clearer understanding of the present invention, rather than to limit the scope thereof.

EXAMPLES

A typical interstitial free (IF) steel was cold rolled and surface cleaned by alkaline degreasing and pickling treatments, and a current of 20 mA was then applied at 60° C. and a pH of 5 to electroplate Fe, one of transition metals, on a surface of a steel sheet. At this time, Fe coating weight was adjusted as described in Table 1 below. After the Fe plating, an annealing treatment was performed and maintained in a 5% $H_2$—$N_2$ atmosphere with a dew point of −40° C., and the steel sheet was then cooled to 500° C.

Thereafter, plating was performed in a hot-dip galvanizing bath at 460° C. and wiping was then performed to adjust coating weight to be about 50 g/m². A hot-dip galvanized steel sheet was manufactured by cooling at a cooling rate of −20° C./s or −65° C./s.

Meanwhile, in the case that the Fe plating was not performed, the IF steel was cold rolled and surface cleaned. Then, an annealing treatment was performed and maintained in a 5% H2-N2 atmosphere with a dew point of −40° C., and a steel sheet was then cooled to 500° C. Thereafter, plating was performed in a hot-dip galvanizing bath at 460° C. and wiping was then performed to adjust coating weight to be about 50 g/m². A hot-dip galvanized steel sheet was manufactured by cooling at a cooling rate of −20° C./s or −65° C./s.

Evaluation of adhesion at ultra-low temperatures for the hot-dip galvanized steel sheets thus prepared was performed by using an impact peel testing machine at −40° C., and the results thereof are presented in Table 1. The following Table 1 presents the results of Fe coating weight, a diameter of a spangle in a hot-dip galvanized layer, impact peel strength, and fractured surface after impact peel test in each Inventive Example and Comparative Example.

Also, the results obtained through the foregoing experiments are presented in FIGS. 2 to 5.

TABLE 1

| Category | Fe coating weight (mg/m²) | Cooling rate (° C./s) | Spangle diameter (μm) | Impact peel strength (N/mm) | Fractured region |
|---|---|---|---|---|---|
| Comparative Example 1 | 0 | −20 | 127.4 | 6.8 | Plated layer |
| Comparative Example 2 | 0 | −65 | 62.9 | 0.0 | Plated layer |
| Comparative Example 3 | 50 | −20 | 64.9 | 2.0 | Plated layer |
| Comparative Example 4 | 200 | −20 | 110.6 | 13.3 | Plated layer |
| Comparative Example 5 | 200 | −54 | 55.1 | 9.6 | Plated layer |
| Inventive Example 1 | 350 | −20 | 206.5 | 15.3 | Adhisive |
| Inventive Example 2 | 350 | −65 | 46.8 | 16.9 | Adhisive |
| Inventive Example 3 | 500 | −20 | 159.0 | 17.6 | Adhisive |
| Inventive Example 4 | 500 | −65 | 45.0 | 20.3 | Adhisive |

Meanwhile, interfaces of base steel sheets and plated layers in Comparative Example 1 and Inventive Example 1 were observed by using a transmission electron microscope (TEM) and the results thereof are presented in FIGS. 5(a) and 5(b), respectively. In Comparative Example 1 shown in FIG. 5(a), a cross section of the hot-dip galvanized steel sheet was composed of a base steel sheet, an inhibition layer, and a plated layer. However, in Inventive Example 1 shown in FIG. 5(b), it may be confirmed that a layer (composite layer) having the shape of a black band was formed between the base steel sheet and the inhibition layer.

As a result of performing a selected area diffraction pattern (SADP) analysis on the composite layer, it may be confirmed that a SADP of the composite layer was matched with those of the base steel sheet and the inhibition layer. As a result, it may be confirmed that the composite layer was a region having conformal relationship with the base steel sheet and the inhibition layer as well as high adhesion between the base steel sheet and the inhibition layer. Therefore, it may be understood that the present invention may increase interfacial adhesion between the base steel sheet and the inhibition layer through the formation of the composite layer and may improve adhesiveness at ultra-low temperatures.

Figure 2:
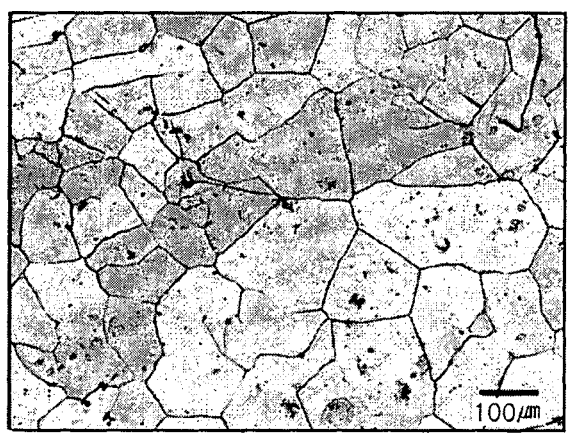
FIGS. 2(a) and 2(b) are micrographs showing surfaces of plated layers in Comparative Example 2 and Inventive Example 2, respectively.
Figure 2:
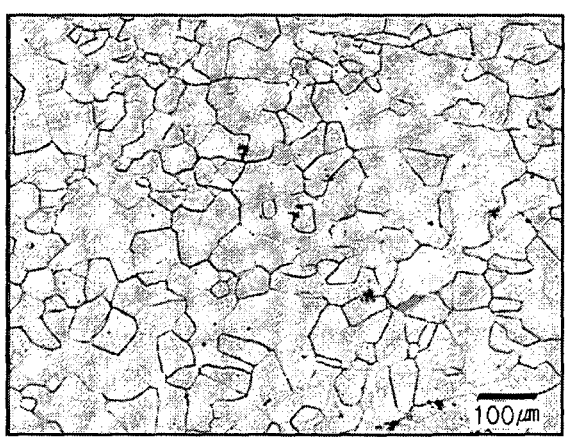

Meanwhile, surfaces of the plated layers in Comparative Example 2 and Inventive Example 2 were observed and the results thereof are presented in FIGS. 2(a) and 2(b), respectively. As illustrated in Table 1 and FIG. 2, the diameter of spangles in the plated layer in Comparative Example 2 was about 62.9 μm and, with respect to Inventive Example 2, the diameter of spangles was about 46.8 μm. As a result, it may be understood that a fine plated structure may be obtained when the cooling rate after hot-dip galvanizing is controlled to be −60° C./s.

Figure 3:
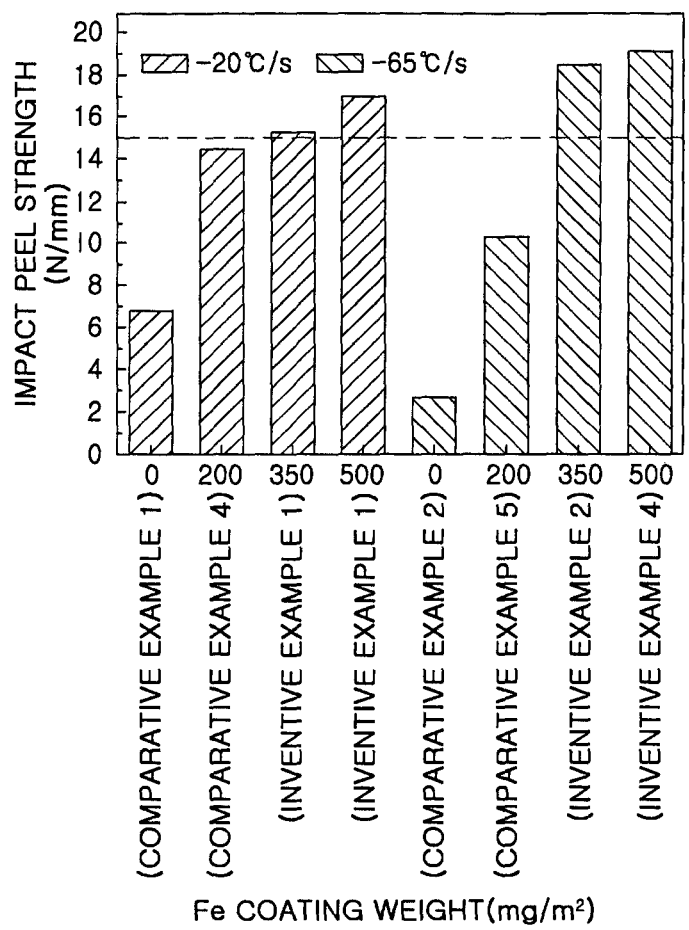
FIG. 3 is a graph showing the results of impact peel strengths measured according to coating weights of iron (Fe) and cooling rates in Comparative Examples 1, 2, 4 and 5, and Inventive Examples 1 to 4.
Figure 4:
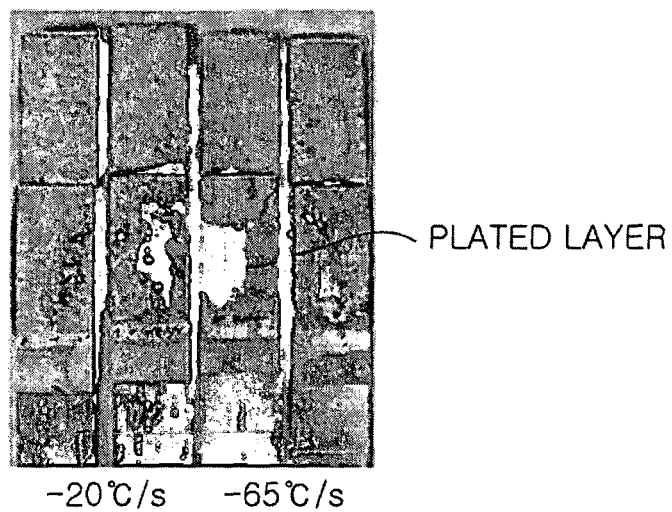
FIG. 4 are photographs of fractured surfaces of samples in (a) Comparative Examples 1 and 2, and (b) Inventive Examples 3 and 4 after impact peel tests, respectively.
Figure 4:
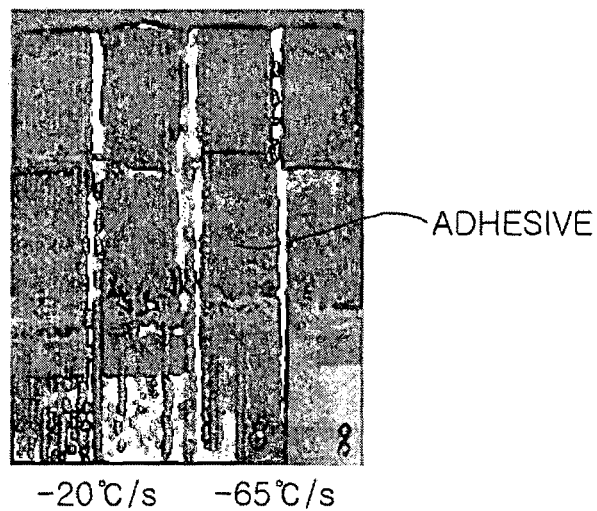
Figure 5:
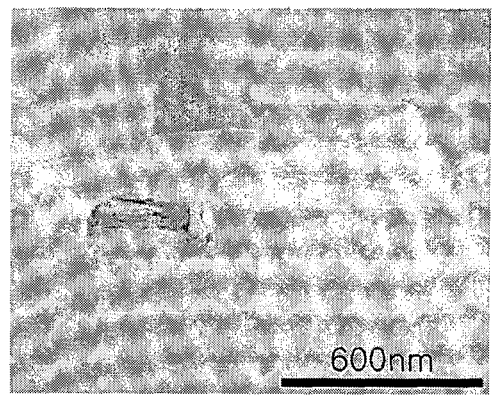
FIGS. 5(a) and 5(b) are transmission electron microscope (TEM) micrographs showing interfaces between base steel sheets and plated layers in Comparative Example 1 and Inventive Example 1, respectively.
Figure 5:
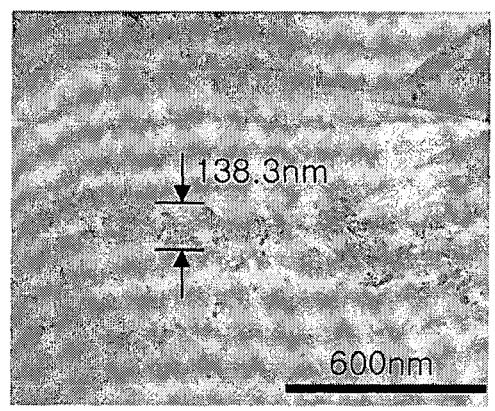

Also, impact peel strengths of Comparative Examples 1, 2, 4, and 5, and Inventive Examples 1 to 4 were measured and the results thereof are presented in FIG. 3. As illustrated in Table 1 and FIG. 3, strength required in the present invention (about 15 N/mm or more) may be secured with respect to Inventive Examples 1 to 4. However, with respect to Comparative Examples, it may be understood that strengths did not reach the strength required in the present invention and fractures occurred in the plated layers.

Meanwhile, impact peel tests were performed on the steel sheets without Fe plating in Comparative Examples 1 and 2, and the steel sheets having a Fe coating weight of 500 mg/m$^2$ in Inventive Examples 3 and 4, and the fractured surfaces thereof are presented in FIGS. 4(a) and 4(b), respectively. With respect to Comparative Examples shown in FIG. 4(a), it may be confirmed that fractures occurred in the plated layers. However, with respect to Inventive Examples shown in FIG. 4(b), it may be confirmed that fractures did not occur in the plated layers and thus, adhesiveness at a low temperature was excellent.

While the present invention has been shown and described in connection with the exemplary embodiments, it will be apparent to those skilled in the art that modifications and variations can be made without departing from the spirit and scope of the invention as defined by the appended claims.

The invention claimed is:

1. A hot-dip galvanized steel sheet having excellent adhesiveness at ultra-low temperatures comprising:
    a base steel sheet;
    a composite layer having a shape of a band formed on the base steel sheet and including transition metal;
    an inhibition layer formed on the composite layer and including an iron-aluminum (Fe—Al) based intermetallic compound; and
    a zinc (Zn)-plated layer formed on the inhibition layer,
    wherein an average diameter of spangles in the zinc-plated layer is 150 μm or less, excluding 0; and
    wherein the composite layer comprises 50 wt. % to 90 wt. % of the transition metal, 10 wt. % to 30 wt. % of Al, and other unavoidable impurities as a remainder.

2. The hot-dip galvanized steel sheet having excellent adhesiveness at ultra-low temperatures of claim 1, wherein the composite layer is in conformal relationship with the inhibition layer and the base steel sheet.

3. The hot-dip galvanized steel sheet having excellent adhesiveness at ultra-low temperatures of claim 1, wherein the composite layer has a cubic structure.

4. The hot-dip galvanized steel sheet having excellent adhesiveness at ultra-low temperatures of claim 1, wherein a thickness of the composite layer is 80 nm or more.

* * * * *

UNITED STATES PATENT AND TRADEMARK OFFICE
CERTIFICATE OF CORRECTION

PATENT NO. : 9,260,787 B2  
APPLICATION NO. : 14/366842  
DATED : February 16, 2016  
INVENTOR(S) : Ju-Youn Lee et al.

Page 1 of 1

It is certified that error appears in the above-identified patent and that said Letters Patent is hereby corrected as shown below:

On the Title Page, Item (57), in the Abstract, lines 8-9,
"a iron-aluminum" should read --an iron-aluminum--.

Signed and Sealed this
Sixteenth Day of August, 2016

Michelle K. Lee
*Director of the United States Patent and Trademark Office*